(12) United States Patent
Horne et al.

(10) Patent No.: US 11,044,158 B2
(45) Date of Patent: Jun. 22, 2021

(54) SELF-CONFIGURING WIRELESS NETWORKS

(71) Applicant: CACI, Inc.—Federal, Arlington, VA (US)

(72) Inventors: Vincent Horne, Oak Ridge, NC (US); Patrick Early, High Point, NC (US)

(73) Assignee: CACI, Inc.—Federal, Arlington, VA (US)

( * ) Notice: Subject to any disclaimer, the term of this patent is extended or adjusted under 35 U.S.C. 154(b) by 57 days.

(21) Appl. No.: 16/550,789

(22) Filed: Aug. 26, 2019

(65) Prior Publication Data

US 2021/0067412 A1 Mar. 4, 2021

(51) Int. Cl.
*H04W 24/00* (2009.01)
*H04L 12/24* (2006.01)
*H04W 24/02* (2009.01)
*H04W 16/18* (2009.01)
*H04W 64/00* (2009.01)

(52) U.S. Cl.
CPC ...... *H04L 41/0886* (2013.01); *H04L 41/0816* (2013.01); *H04L 41/145* (2013.01); *H04W 16/18* (2013.01); *H04W 24/02* (2013.01); *H04W 64/006* (2013.01)

(58) Field of Classification Search
CPC ............... H04L 41/0886; H04L 41/145; H04L 41/0816; H04W 24/02; H04W 16/18; H04W 64/006
USPC ....................................................... 370/254
See application file for complete search history.

(56) References Cited

U.S. PATENT DOCUMENTS

| 8,150,465 | B2* | 4/2012 | Zhang | G01D 21/00 455/557 |
| 9,730,078 | B2* | 8/2017 | Nixon | H04L 41/12 |
| 2004/0203436 | A1* | 10/2004 | Oesterling | H04B 17/20 455/67.11 |
| 2006/0019679 | A1* | 1/2006 | Rappaport | G01S 5/0252 455/456.5 |
| 2007/0082677 | A1* | 4/2007 | Donald Hart | H04W 16/18 455/456.1 |
| 2009/0059814 | A1* | 3/2009 | Nixon | H04W 16/18 370/254 |
| 2011/0090885 | A1* | 4/2011 | Safavi | H04W 72/082 370/338 |
| 2015/0163633 | A1* | 6/2015 | Mishra | H04W 4/023 455/456.6 |
| 2016/0323753 | A1* | 11/2016 | Zhang | H04B 17/318 |

(Continued)

*Primary Examiner* — Robert J Lopata
(74) *Attorney, Agent, or Firm* — BakerHostetler

(57) ABSTRACT

The present disclosure pertains to a self-configuring network comprising one or more nodes each configured to provide wireless coverage to one or more transceivers. Some embodiments may: obtain a wireless propagation model, including environmental data; determine, via a computing device of the network, a set of optimal operating parameters using the obtained model and the environmental data; and configure, via the computing device, at least one of the one or more nodes with the set of optimal operating parameters. As a result, overall system performance on the larger macro scale may be maximized. That is, improving performance of only one or a few devices, on a micro-scale, may not be sufficient, as this may be achieved at the expense of harming performance of other devices.

20 Claims, 8 Drawing Sheets

(56) References Cited

U.S. PATENT DOCUMENTS

2018/0041868 A1* 2/2018 Gunnarsson .......... G01S 5/0036
2019/0357056 A1* 11/2019 An ....................... H04W 16/18

* cited by examiner

SELF-CONFIGURING WIRELESS NETWORKS

TECHNICAL FIELD

The present disclosure relates generally to systems and methods for deploying dynamically configurable nodes in a wireless network. More particularly, ways of rapidly deploying a wireless system having radios that may deterministically improve performance are disclosed.

BACKGROUND

Radio channels are known to be random, time-varying, and they behave differently based on the chosen frequency band (e.g., 900 MHz, 2.4 GHz, 28 GHz). Some different types of independent phenomena that can affect (e.g., amplitude attenuation, phase adjustment, etc.) signals' propagation are multipath fading, shadowing, atmospheric conditions, scattering, reflections, obstructions, refractions, absorptions, and other path loss causing sources, much of which is based on the wavelengths of transmitted (e.g., sinusoidal) signals.

Known ways of designing and deploying radio networks include performing propagation modeling, via a server and via radio frequency (RF) link budget analysis, which determine how strong a signal needs to be, the signal to noise ratio (SNR), a supported bit-rate, and a modulation-coding scheme (MODCOD), at least some of which is fed into the model. Different types of network nodes are known, but they always require extensive pre-engineering work (e.g., lengthy design process, simulations, testing, etc.), and they cannot adapt to a changing environment. When deployed, the configurability is manual, limited (e.g., presented in a simple user interface without many options for a technician), and based on minimal information (e.g., with no access to real or near-real time information). In addition, where automated mechanisms might be implemented, the inputs driving the controls are often of a local nature with limited benefit to the overall network; such lack of inputs from more distant network nodes can therefore result in suboptimal parameter settings and inferior overall network performance. Such networks therefore suffer for not being automated and/or for providing inaccurate, imprecise, and suboptimal performance.

Known wireless systems are not able to perform optimally at low costs (e.g., without extensive non-recurring, preliminary engineering work, including using costly tools and equipment). These systems are not able to adapt the services they provide to substantial, environmental changes or to design criteria changes that often occur over time.

SUMMARY

Systems and methods are disclosed for automatic and dynamic self-configuration of a wireless networking system based on evaluations (and reevaluations) for optimal configuration and performance. The self-configuration may be performed with respect to locally performed propagation modeling, and such information can be shared across the entire wireless network with a goal of achieving an optimal system-wide configuration of the RF operational parameters across all nodes within the network. As a result, overall system performance on the larger macro scale may be maximized. That is, improving performance of only one or a few devices, on a micro-scale, may not be sufficient, as this may be achieved at the expense of harming performance of other devices.

Accordingly, one or more aspects of the present disclosure relate to a method for self-configuring a network, which comprises one or more nodes each configured to provide wireless coverage to one or more transceivers, by: obtaining a wireless propagation model, including environmental data; measuring one or more wireless parameters with respect to operation of at least one or more nodes; determining, via a computing device of the network, a set of optimal operating parameters using (i) the obtained model, (ii) the environmental data, and (iii) the one or more measured parameters; and configuring, via the computing device, at least one node with the set of optimal operating parameters. The method is implemented by one or more hardware processors configured by machine-readable instructions and/or other components.

Yet another aspect of the present disclosure relates to a system configured for self-configuring a network. The system comprises one or more processors and other components or media, e.g., upon which machine-readable instructions may be executed to perform the method. The method may be iteratively executed until all nodes of the network are self-configured and deployed. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Figure 1:
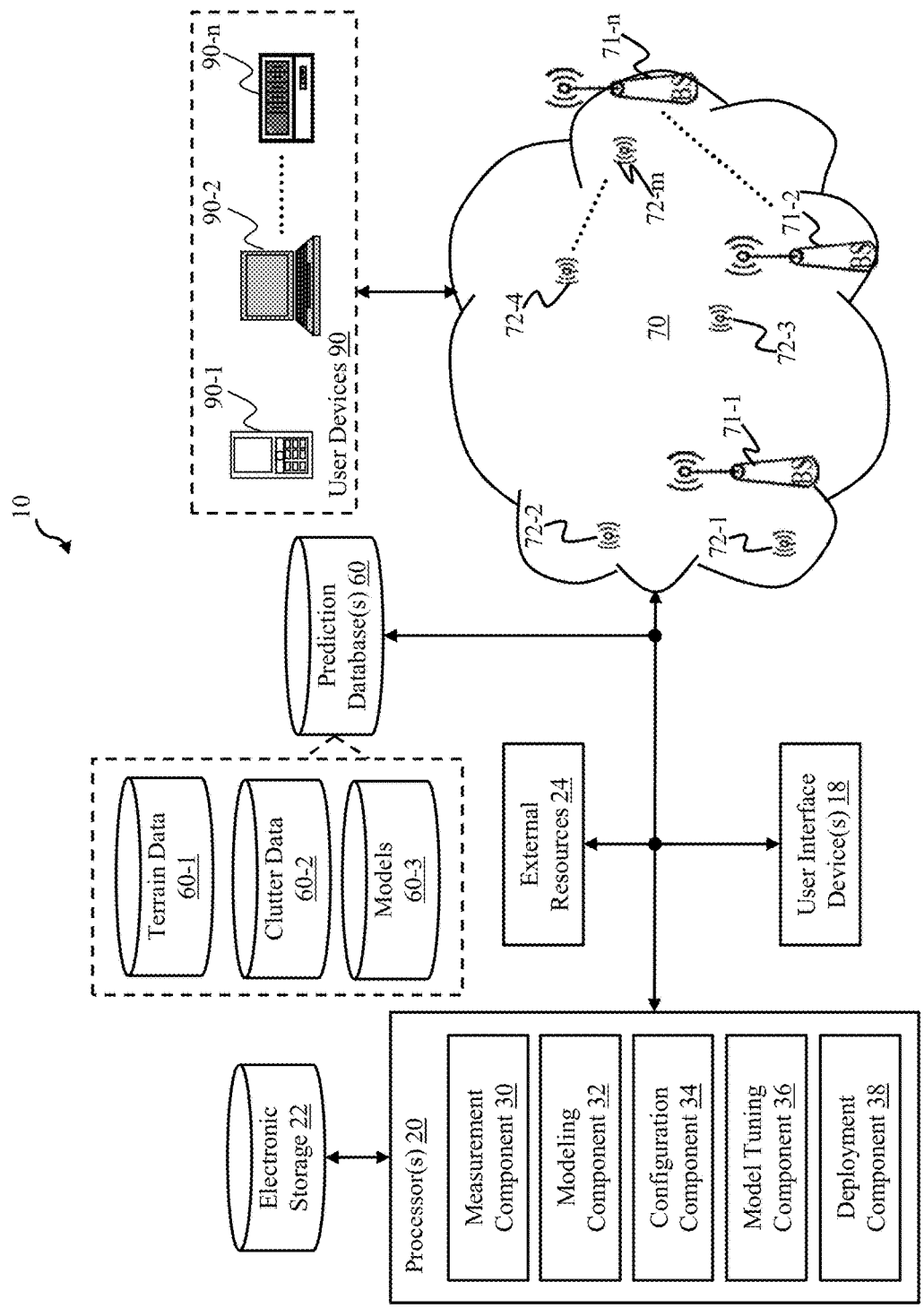
FIG. 1 depicts an example of a system in which a self-adapting network of wireless nodes is configured, in accordance with one or more embodiments.

FIG. 1 illustrates self-configuring system 10, which may continually self-improve its performance. System 10, when implemented, may provide several advantages over known ways of deploying a wireless system. For example, system 10 may provide a holistic approach to dynamic configuration, e.g., to solve known inefficiencies. Deployed network 70 of system 10 may provide optimal results that may further improve or maintain a high level of performance over time. The disclosed approach is holistic, for at least the reason that it may facilitate local performance of environmental measurement and propagation modeling at a high resolution. That is, by using these measurements and modeling, system 10 may make predictions that are more granular than is otherwise possible by a manufacturer's model procured from a vendor. Such "off the shelf" model may at best provide a signal loss versus distance, broad-based averages, and/or generic values from a titrate to SNR table.

The performed propagation modeling may be based on RF parameters locally measured, which may be applied to the self-configuration and/or to a tuning of the model. System 10 thus further outperforms known approaches by the model-retuning and by having desired coverage and capacity as inputs.

Some embodiments of system 10 may perform rapid (e.g., within a few minutes, within an hour, or within a 24-hour period) and optimal self-configurations (and reconfigurations), e.g., to adjust to dynamic changes. By this automated approach of addressing to changes, e.g., in real-time, some embodiments reduce configuration errors and continually provide optimal performance. As such, embodiments of system 10 may lower cost and result in faster deployments.

As a result of any reconfiguration, the disclosed approach provides more accurate predictions (e.g., of path loss) for better determining RF operating parameters. Better-chosen RF operating parameters may thus result in better performance, e.g., in terms of power consumption and/or speed, after the radio is self-configured with the improved RF operating parameter(s).

More accurate predictions, via the performed propagation modeling, may cause system 10 to better determine a location for deploying a node. As a result of the deployment of this node to this determined location, the node (e.g., 71-1) may perform better (e.g., in terms of speed, power consumption, and/or accuracy). In this example, node 71-1 may now perform at higher levels (e.g., with quality of service (QoS) parameters more consistently satisfying criteria). The improvements in accuracy may be based on a more reliable, precise, and/or actual representation of the wireless channel to which the radio is attempting to establish (or improve characteristics of). This improved accuracy may also relate to the location to which the respective radio is determined to be deployed.

In some embodiments, to-be-deployed network 70 comprises a plurality of nodes, e.g., 71-1, 72-1, 72-2, 71-2, 72-3, 72-4, 71-$n$, 72-4, and 72-$m$, n and m being natural numbers. In some embodiments, network 70 is the Internet, base stations 71 thus providing user devices 90, via transceivers 72, access to the Internet or another network. In these or other embodiments, networking radios 71 and/or 72 may implement any wireless protocol, such as Wi-Fi technology (e.g., via the hypertext transfer protocol (HTTP) and/or the file transfer protocol (FTP)), Bluetooth, Zigbee, near field communication (NFC), simple object access protocol (SOAP), wireless application protocol (WAP), ZigBee, KNX, WiMax, and the like.

In some embodiments, each of radios 71-1, 71-2, . . . and 71-$n$ is a base station (BS), access point (AP), evolved NodeB, or another wireless access provider. In some embodiments, transceiver radios 72 may receive communications coverage 74 from one or more AP radios 71, the coverage being access to a communications network.

Figure 3A:
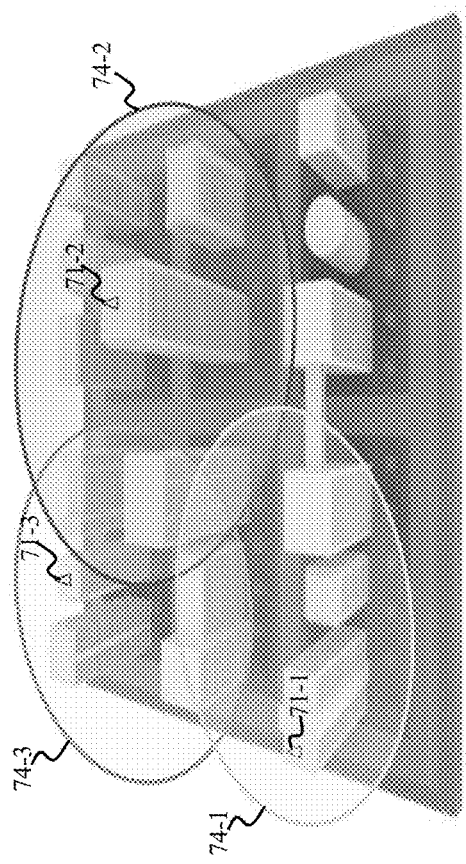
FIGS. 3A-3B depict, from two different perspectives, deployment at an exemplary site of a self-configuring, dynamic network, 3A showing coverage provided by each of three different nodes, and 3B showing communications links between the nodes and some transceivers, in accordance with one or more embodiments.
Figure 3B:
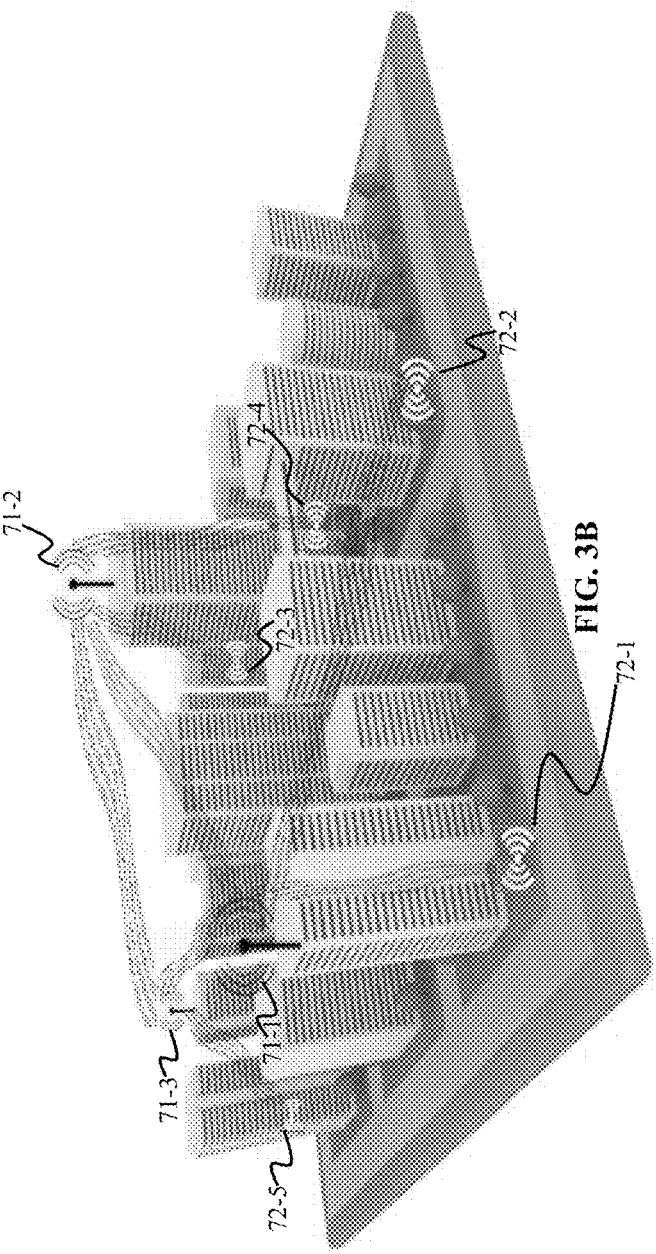

As depicted in the example of FIGS. 3A-3B, some embodiments of network 70 comprise: a first subnetwork (which is depicted in the bottom-left oval) within coverage area 74-1 that comprises radios 71-1, 72-1, and 72-2; a second subnetwork (which is depicted in the oval on the right side) within coverage area 74-2 that comprises radios 71-2, 72-3, and 72-4; and a third subnetwork (which is depicted in the upper-left oval) within coverage area 74-3 that comprises radios 71-3 and 72-5. But this example is not intended to be limiting, as this disclosure contemplates any suitable number of radios (e.g., AP nodes, transceivers, or another wireless networking device) in any suitable configuration (e.g., with a suitable number of transceiver radios 72 connected to each AP radio 71).

In some embodiments, each node 71 may be an access point (AP) radio. In these or other embodiments, each transceiver 72 may be a repeater, amplifier, radio, or another wireless terminal. Herein, the term radio may refer to an AP radio and/or to a wireless transceiver, the terms radio and node being used interchangeably.

Some embodiments of system 10 may perform advanced RF propagation modeling, thus providing more accurate, granular, and deterministic results using actual geodata. For example, such modeling may use actual terrain and clutter data. This modeling may be performed in any radio device(s) of network 70, such as in one or more nodes 71, in one or more nodes 72, and/or in a centralized server. For example, some embodiments may run the RF propagation modeling and/or other modeling software in multiple devices of the network to make use of their computing resources not otherwise being used, e.g., to facilitate network communication or perform another service. That is, some embodiments may harness processor resources of network 70 that are relatively idle, inactive, or underutilized, to run at least a portion of the disclosed algorithms.

A software development kit (SDK) procured from a vendor (e.g., Infovista) may be used for applying a pre-Engineered model to the disclosed self-configurations. Such use of a commercially integrated SDK may provide improvements in both speed and accuracy. This commercially integrated SDK may be a set of software development tools for customizing, e.g., via application programming interfaces (APIs), to the particular application of embedded propagation modeling. The vendor supplied propagation model may support a complex user interface with dozens of dropdown lists and possible configurations, but the disclosed approach is to use it as an SDK. The propagation modelling engine may be adapted by additional software to thus be integrated with a radio of network 70. By this approach, a proven model may thus be used to provide optimal accuracy, e.g., in predicting a path loss between two points (e.g., AP radio 71 and transceiver radio 72).

The disclosed model may be used to perform modeling of the propagation of RF signals in a range, e.g., from 10 kHz to 28 GHz. Some exemplary propagation models include: TIREM 3.15, Longley-Rice 1.22, Okumura, Hata, COST Hata, COST 231 Extended Okumura-Hata, Undisturbed Field/Mobile-to-Mobile, Low Frequency/Medium Frequency (LF/MF), ICEWave, ITURHFProp, Log-distance Pathloss, Rayleigh Fading, Rician Distribution, Wall Attenuation Factor, Motley-Keenan, and Adjusted Motley-Keenan models. Some of these models may be used for predicting indoor attenuations and some may be used for predicting outdoor attenuations. The disclosed approach thus contemplates deployment of a wireless network within a building or another set of structures.

Disclosed are some modeling tools but not an exhaustive list for possible implementation. In some embodiments, models 60-3 may be used to compute RF coverage and capacity within network 70 for establishing network 70. Some embodiments of the disclosed radios may automatically self-deploy themselves. In these or other embodiments, a radio (e.g., 71-1) may guide a technician as to where to deploy itself and/or other radios (e.g., 71-2, 71-3, etc.), the other radios 71 being also able to progressively self-configure. This self-configuration may be of RF operational parameters during and/or after deployment of said radio(s).

Some embodiments of system 10 may perform RF measurements of a radio's environment. These RF measurements may be used not only to make the modeling analyses more accurate, but they can also be used to tune the RF propagation models. Propagation model tuning may thus further improve accuracy, while also reducing erroneous predictions. Some embodiments of system 10 may cause reduction in operating costs, as compared to known approaches.

By the disclosed approach, an overall system performance may be improved, e.g., when viewed as a single metric. It is easy to improve performance of one or a few RF devices in a system, but this is often done at the expense of reduced performance of other devices, which is not very optimal. For example, a user may always turn up the RF transmit power on one device, and all other nearby devices (e.g., on the same frequency where the frequency is being re-used between cells) will have reduced performance. But if the settings in the cells reusing the frequency were coordinated by a central node (or one of the cell's nodes) at a higher level, using data from the much wider area, the RF transmit power may be more optimally set. This may be just a matrix that has only one single solution that is optimal. This may be an advantage of the coordinated modeling, as opposed to automation at a micro-level, the latter being, e.g., RF power control between only the two transceivers.

Some embodiments of system 10 may use external measurement data, such as drive test data, as possible input data into the dynamic configuration mechanisms. And this may be because this may provide much more actual data that can be used to better tune the RF propagation models. That is, the model tuning may need much data to achieve the best tuning statistically.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, geodata used by the RF propagation models, information received via user interface devices 18 and/or other external computing systems, information received from external resources 24, and/or other information that enables system 10 to function, as described herein.

In some embodiments, external resources 24 are one or more sensors (e.g., for measuring wireless parameters). External resources 24 may further be sources of information (e.g., databases, websites, etc.), external entities participating with system 10, one or more servers outside of system 10, a network (e.g., the Internet), electronic storage, equipment related to Wi-Fi technology, equipment related to Bluetooth® technology, data entry devices, and/or other resources. In some implementations, some or all of the functionality attributed herein to external resources 24 may be provided by others resources included in system 10. External resources 24 may be configured to communicate with processor 20, user interface device 18, electronic storage 22, and/or other components of system 10 via wired and/or wireless connections, via a network (e.g., a local area network and/or the Internet), via cellular technology, via Wi-Fi technology, and/or via other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some embodiments, processor 20 may belong to a user device, a consumer electronics device, a mobile phone, a smartphone, a personal data assistant, a digital tablet/pad computer, a wearable device, a personal computer, a laptop computer, a notebook computer, a work station, a server, a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of measurement component 30, modeling component 32, configuration component 34, model-tuning component 36, deployment component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. The description of the functionality provided by the different components 30, 32, 34, 36, and/or 36 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

In some embodiments, radios 71 and/or 72 of network 70 connect to each other for any purpose or application. These radios may be used to unidirectionally (half duplex) or bidirectionally (full duplex) transmit data. They may be initially configured by a technician's computer via user interface devices 18 to minimal levels of operation. After the initial configuration, the radios may reconfigure themselves to improve the performance. The configuration may be based on such parameters as frequency, transmit power, modulation, etc. As such, performance can be improved or worsened depending on how well those parameters are set. By having the radios internally run RF propagation modeling, performance may be further improved. In some embodiments, a radio of network 70 that has more processing power (e.g., greater size of RAM, larger number of processors, higher processors' clock frequency, etc.) may perform the modeling, but in other embodiments a central computer that is connected to all of the radios may do the computing for RF propagation modeling. In some embodiments, user devices 90 (e.g., 90-1, 90-2, . . . 90-*n*, n being a natural number) receive a connection to network 70 via transceivers 72 (or even via nodes 71). In some embodiments, user devices 90 may each be a mobile phone, a laptop, a sensor (e.g., camera), a desktop computer, a tablet computer, a smart appliance, a vehicle, and/or any user-operated device that may require a connection to network 70. In some use cases, user devices 90 may be one or more sensors (e.g., for visual surveillance, for humidity and/or temperature determination, for olfactory sensing, for radar or motion detecting, and/or for any other suitable application). In some embodiments, each of user devices 90 may be coupled to transceiver radio 72.

In some embodiments, measurement component 30 is configured to facilitate continual performance improvements (e.g., based on detected changes to an environment of at least one deployed node of network 70, an interference with respect to wireless operation of the at least one node, and a performance required from the one or more respective transceivers), whether they be regular, periodic, or on demand. For example, one or more nodes of network 70 may be configured to recheck configuration settings at a particular time of day (e.g., at 3 AM). When any relevant portion of system 10 changes (e.g., whenever another radio is added to the system), one or more of the nodes of network 70 may re-perform computations to see if any configuration settings need to be changed; if so, the change(s) may be immediately self-configured. For example, a capacity requirement (e.g., throughput) may increase for one of transceivers 72, which may trigger re-computation of some or all RF parameters of one or more nodes of network 70.

In some embodiments, measurement component 30 is configured to periodically determine whether there are design criteria changes (e.g., additional coverage and/or capacity needs), a change in environment (e.g., that would cause electromagnetic interference), a change in clutter, and/or a change in terrain.

The disclosed embodiments provide automated and dynamic self-configuration of the RF parameters due to changes in the system detected by measurement component 30 or configuration component 34. For example, there may be a change in system 10 in locations and/or quantities of AP radios 71 that are needed for supporting the desired or required coverage and/or capacity. In another example, there may be a change in system 10 in locations and/or quantities of transceiver radios 72 needed due to new service needs. In another example, there may be a change in system 10 in changes to positions, characteristics, and quantity of external RF interference sources. In another example, there may be a change in system 10 in bitrates or quality of service needs of the existing transceiver radios. In another example, there may be a change in system 10 in changes in clutter over time, such as changes in buildings, roads, and/or foliage.

The disclosed approach contemplates mobile networks, i.e., where one or more radios of network 70 that provide or receive coverage are in motion and thus with a frequently changing environment. Even when network 70 is immobile after deployment, there may still be many sources of changes that affect signal propagation. During such instances of change, it is inefficient and thus costly to have skilled RF engineers perform the costly and timely rework. Instead, their tools and processes are contemplated herein to be automated in the system, e.g., to allow these systems to better adapt to the changes in service requirements or RF environment. This approach actually provides improved performance, since deployed wireless system 10 may have access to information and/or measurements that would not be available during pre-deployment engineering work. In some embodiments, measurement component 30 measures one or more RF parameters, including an SNR value, a power level of a received signal, and any other suitable, wireless parameter.

In some embodiments, measurement component 30 is configured to automate bit-rate testing to test throughput of system 10 by loading it with test data. RF measurements may then be taken, which are more representative of real world conditions than a statistical analysis. Some embodiments of system 10 may thus implement algorithms for performing self-testing of radio link performance, results of such testing improving the self-optimization.

In some embodiments, modeling component 32 is configured to implement algorithm(s) such that operating parameters for self-configuring are determined. The disclosed modeling may be deterministic and statistic. More particularly, the propagation modeling performed for initially configuring a radio may be based on a radio channel evaluated statistically. That is, such initial modeling may be performed without accounting for specific terrain data, i.e., the channel parameters may be modelled as stochastic variables. The propagation modeling performed after the initial configuration may be deterministic in nature, due to the taking into account of the actual, real-world environment (i.e., based on the combination of measurements and a priori data, such as geodata).

In some embodiments, the disclosed modeling performed within a computing device of a radio itself may be performed using coverage requirements and/or using desired user device 90 deployment locations (e.g., where surveillance cameras are needed). The locations of user devices 90 may be significant because transceiver radio 72, receiving coverage by AP radio 71, may be embedded in user device 90 or may be directly connected by a minimal length cable.

In some embodiments, the RF propagation models and any required geodata files useable in system 10 may be accessible locally (e.g., within radio 71, 72, or another computing device of network 70), this information being (in these or other embodiments) accessible in an administrative or central device (e.g., server) or node (e.g., AP radio). In some embodiments, each radio 71 may compute coverage and may, with at least that information, guide the deployment of technicians to an optimal location to deploy each subsequent radio. In these or other embodiments, radios 71 may work together (e.g., coordinate, collaborate, and/or otherwise interact) to self-optimize (e.g., RF, microwave, infrared, visible light, or other portion of wireless spectrum) parameters, for improved performance.

Radio waves are known to decrease in power, as they propagate away from a transmitter, the waves being affected by environmental variables. Some embodiments of modeling component 32 may therefore simulate, via a model, radio wave signal power by determining an amount of path loss the signal undergoes between the transmitter and a receiver. The model may be used to calculate loss as a function of distance and frequency, and it may include the effects of obstructions, terrain effects, and/or other environmental factors.

In some embodiments, modeling component 32 of any deployed node(s) may identify dead zone(s), indicate where an expansion point (e.g., another radio) may be deployed, and/or determine a minimum number of additional radios that will be needed to satisfy coverage. For example, a deployed node may, upon being powered on, run propagation modeling and self-tests (e.g., a built-in self-test) to determine that it itself does not provide ideal coverage (e.g., a signal attenuation level breaches a lower-level threshold, resulting in suboptimal performance) to a particular transceiver radio requiring a connection. In some embodiments, modeling component 32 of deployed nodes may indicate, e.g., where a next AP radio 71 needs to be deployed (e.g., at a higher elevation point) or where any of the deployed radios need to be relocated. Since a minimal number of potentially-expensive nodes are deployed by such embedded use of propagation model 60-3, cost for deploying network 70 may be minimized.

The software obtained from database 60 may comprise propagation modeling algorithms and environmental data or geodata. These latter terms generically refer to terrain data from database 60-1 and clutter data from database 60-2, either of which may in turn comprise a grid of data, e.g., with a 30 meter or less resolution. That is, in this example, about every 30 meters there may be a data point. Clutter may express, e.g., in a digital raster file or in an image format, the impact on RF propagation by objects. The geodata obtained from database 60-2 may comprise colors or numbers that represent different clutter types and/or elevation points, these features being classified according to their physical and/or electromagnetic properties. Clutter data 60-2 may be height-attributed clutter data, i.e., with clutter height at each grid point (e.g., of a building in a downtown area). For example, an object classifiable as clutter may be located at a particular X, Y coordinate and may have a height of, e.g., 20 meters. As such, clutter data 60-2 may comprise 2D or 3D information, the latter of which may be depicted as a 3D drawing of actual objects in a radio's environment. Some different types of clutter are water, land and landscaping, trees and other foliage, residences, governmental structures, buildings of businesses, and/or other objects typically found in a rural or urban environment. Typically, clutter closest to a radio may have the biggest negative impact. But a nature of the clutter and the wireless propagation parameters themselves may determine the extent of impact.

In some embodiments, modeling database 60-3 may be stored in a memory of each transceiver or in a memory of one or more other nodes (e.g., which may have additional storage and processing capability for performing the modeling). In these or other embodiments, the one or more models of 60-3 may be upgradeable and/or updateable. Some embodiments of modeling component 32 thus support receiving updates to geodata and re-running model simulations, for making more accurate predictions based on the updated geodata.

In some embodiments, every radio in network 70 performs RF propagation modeling, e.g., such that a deployment technician is able to know, in near real-time, where a next radio should be installed for optimal performance. For example, a technician may initially deploy at least some of radios 72 and then power them up. Next, the technician may load at least some of the aforementioned deployment criteria into radios 72. Then, the technician may deploy a first AP radio 71 (e.g., 71-1), which is subsequently powered up. That first AP radio 71 (e.g., 71-1) may then connect to any transceiver 72 that is within its coverage area. In this example, AP radio 71-1 may then run propagation modeling, compute an ideal locations of one or more other needed AP radios 71 (e.g., 71-2, 71-3, . . . 71-n). These locations may then be conveyed (e.g., via user interface device 18) to the technician. The technician may then deploy the next radio (e.g., 71-2) at or near the location recommended by the first AP radio (e.g., 71-1). The technician may then, via system 10, re-run the propagation modeling (e.g., at AP radio 71-1 and/or 71-2) and compute a recommended location for a next radio (e.g., 71-3). These operations may be repeated until all the necessary AP radios 71 have been deployed, and the system is operational. As shown in FIG. 3E, at this time (i.e., post deployment of at least one radio) a user may remotely control and receive status from computing devices of system 10. As has been demonstrated by this and other examples, no advanced engineering knowledge is required by technician(s), and there is required no pre-engineering planning work.

Some embodiments may configure network 70 such that at least one of the nodes has a point to multipoint connection, meaning that this node may have to communicate with each of a plurality of other nodes. The propagation modeling performed with respect to that node may therefore have to factor in not only the path losses in multiple different directions but also the performance (e.g., bandwidth, frequency, bitrate, power level, MODCOD, etc.), for each of the different connections or links.

In some embodiments, each AP radio 71 may self-configure, via configuration component 34, operating parameters of different types (e.g., $A_1$, $B_1$, and $C_1$ for 71-1, $A_2$, $B_2$, and $C_2$ for 71-2, and $A_n$, $B_n$, and $C_n$ for 71-n). In these or other embodiments, each transceiver radio 72 may similarly self-configure, via configuration component 34, operating parameters of different types. In some embodiments, the different types of operating parameters comprise an output power, a frequency, a bandwidth, a type of channel coding, an amount of forward error correction (FEC), a modulation (e.g., amplitude modulation, frequency modulation, phase modulation, or another suitable type of modulation), and a type of multiplexing (e.g., time division multiple access, frequency division multiple access, code division multiple access, orthogonal frequency division multiple access, or another suitable type of multiplexing). In some embodiments, the radios may self-configure non-RF-related parameters, such as networking parameters (e.g., IP address, type of routing, payload size, type of encryption, TCP/UDP ports, etc.).

In embodiments where one or more radios of network 70 are initially configured, configuration component 34 may initially configure the one or more radios based on parameters determined via known Engineering equations (e.g., link budget analysis). In some embodiments, the initial configuration comprises use of a statistic propagation model and a subsequent loading of a deterministic propagation model into a node of network 70. Use of deterministic propagation model 60-3 may result in an evaluation of an environment of a network node, e.g., by using real terrain and clutter data.

Some embodiments of configuration component 34, which may be integrated in and/or packaged with a radio (e.g., 71, 72, or another device), may self-configure in response to a changing environment, including a change in interference, terrain, clutter, etc., by dynamically self-determining one or more of operating parameters, current-provided coverage, and a more optimal deployment location. Once self-configured and deployed, a user at a remote (i.e., relative to the deployed radios) location may further configure, as depicted in FIG. 3E. For example, a network operator in London may configure a deployed system in Chicago, e.g., to change a transmit or receive frequency value for one of the radios. Similarly, after system 10 is self-configured and at least some of the deployed radios have established a network connection, a central or master node of the network may make subsequent decisions for setting future operating parameters. The present disclosure thus contemplates scenarios where continual self-configuration (e.g., based on continual real-time measurements of RF parameters) is combined with independent, remote configuration.

In some embodiments, the self-configuration is triggered to occur periodically (e.g., hourly, daily, weekly, monthly, or at any suitable period), irregularly (e.g., based on a detected change to the radio's environment), or on demand (e.g., commanded by a network administrator).

In some embodiments, a number of radios needed to support performance demand in system 10 may be less, by following the disclosed self-configuring approach, than if a same performing system were configured without the self-configuring. And this is because the disclosed approach more efficiently uses its resources, e.g., to avoid otherwise unforeseen interference or other wireless propagation issues. Similarly, by following the disclosed approach, a height needed to install a radio may be lower than if the disclosed approach were not followed. That is, a self-configured radio may determine a location for a next-to-be-deployed radio that is at a minimum height to achieve performance demand (which saves cost because high-elevation installations e.g., on 300 foot towers, are expensive). As such, cost may be saved, since installations on taller buildings or on towers are more expensive than lower installations. Similarly, by the disclosed approach, capacity may be the same or greater, or the amount of required spectrum used by the system may be reduced, from transceiver radios operating with dynamically determined parameter values that are self-configured than if the same radios were not operating with these precise parameter values. And still another benefit is that the output power level dynamically self configured for a radio may be less than if that radio were otherwise configured; this improves performance of system 10 because radios of network 70 are less likely to interfere with one another if their power levels are less, and thus if they are not automatically transmitting at full power.

Some embodiments may adapt to substantial, environmental changes using a same, high level of engineering design scrutiny to provide and maintain (e.g., indefinitely over time) a high performance level. Some embodiments may support new coverage needs (e.g., requiring changes in quantity and/or locations of radios 71 and/or radios 72). To address environmental changes that involve new demands for wireless service, from deployed system 10, some embodiments may increase capacity via new and/or relocated transceivers. Configuration component 34 may further be configured to address higher bitrate requirements, to the extent that hardware of radios 71, 72 supports changed operating parameters.

In either or all of these situations, the operating parameters may need to be re-evaluated to always provide optimal RF performance. That is, changes in RF parameters may potentially provide better overall system performance. Therefore the ideal system is able to change dynamically, automatically, and rapidly to such changes in order to always provide the best service.

The disclosed approach improves upon known methods of configuring a network that may merely result in a basic, minimal level of connection, which is very different from continually being able to achieve optimal performance, e.g., via an optimal combination of self-configured settings (e.g., frequency, bandwidth, power, channel coding, modulation, etc.). As such, each node of network 70 may be configured with its own optimal set of parameters.

Some embodiments of system 10 may use software running on the radios to collect and geolocate sources of radio-frequency interference (RFI) or of electromagnetic interference (EMI). Such sources of disturbances may degrade performance or even stop at least a portion of network 70 from functioning. By preventing them from disturbing the network, network connections may be sustained, and a bit error rate (BER) may improve.

Figure 4A:
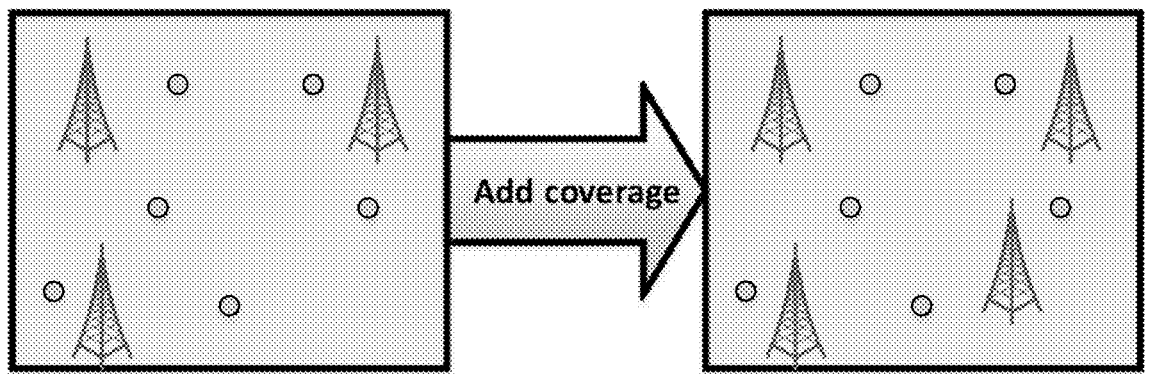
FIG. 4A depicts the triggering of network deployment of another access point (AP) site and associated AP transceiver radios to satisfy coverage area requirements, in accordance with one or more embodiments.
Figure 4B:
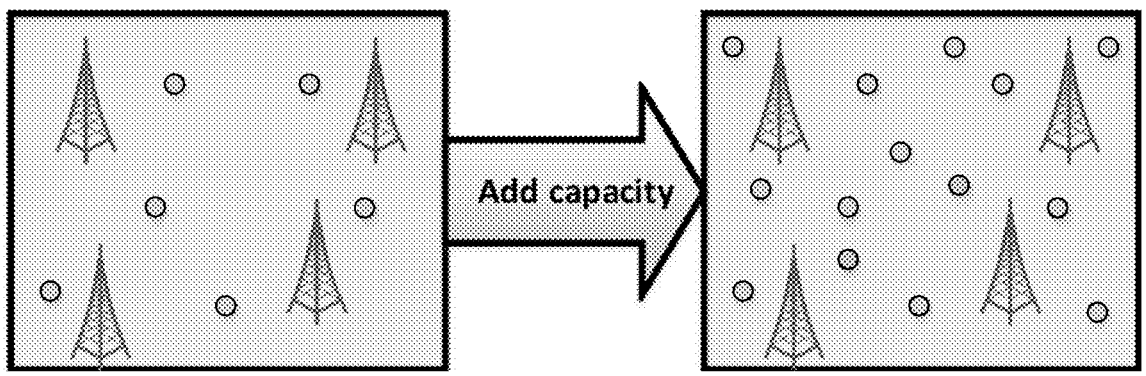
FIG. 4B depicts the triggering of network deployment of other AP transceiver radios at existing AP sites to satisfy throughput requirements, in accordance with one or more embodiments.
Figure 4C:
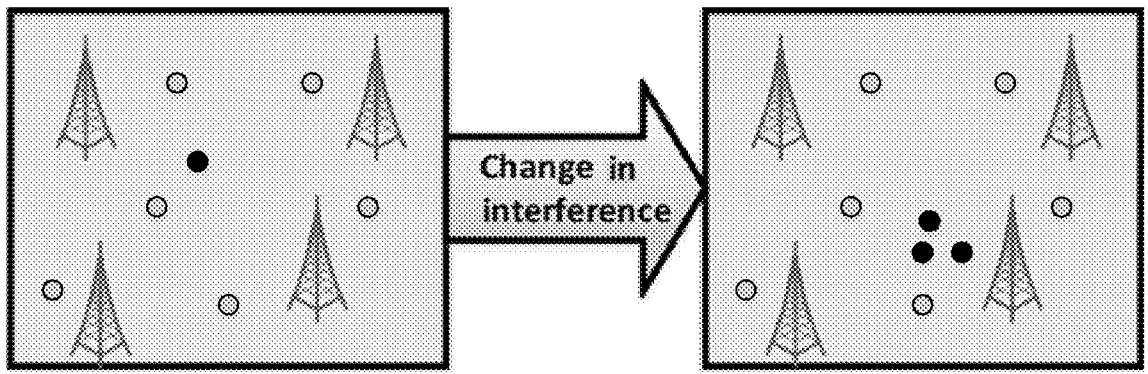
FIG. 4C depicts the triggering of another self-configuration to adapt network operating parameters to changing interference, in accordance with one or more embodiments.

Some embodiments may adapt to changes in characteristics, locations, and/or quantities of external radio interference sources, as depicted in FIG. 4C, by adjusting operational parameters to the adjusted environment and/or demand. In some implementations, when the environment changes, the interference changes, which may lead to a reconfiguration need. Some embodiments of system 10 may better adapt to changing RF interference conditions by combining RF interference detection algorithms with the modeling SW implemented in the radios.

In some embodiments, model tuning component 36 is configured to use one or more machine-learning algorithms to learn behavior of the network such that a change is detected as regularly occurring at a certain location and time, wherein the machine-learning comprises a prediction of the behavior by a trained model. These or other embodiments may implement model tuning by using correction factors. For example, in a scenario where there are dozens or hundreds of radios deployed in a city or other area, the propagation modeling may predict for one of the radios that its transmit power is unnecessarily too high. That is, the clutter affecting this radio may not really cause the propagation path to be as lossy as the model predicts. By tuning the model using measured parameters, the radio may preferably self-determine a lower signal transmit power level.

The node that does the modeling may further perform self-tuning based upon test signals that the radios can send to each other. For example, the radios may measure, via one or more sensors, what the path loss is and how strong the signals are from the other radios, and they can use this information to tune the model. By self-configuring and reconfiguring themselves, the disclosed radios always maintain optimum performance. And improved/re-tuned models may do better at predicting optimal parameters for self-configuration.

In some embodiments, model tuning component 36 is configured to maximize the capacity of network 70, i.e., the capacity per unit area (e.g., per square mile). The capacity is herein defined as the total aggregate bitrate that a set of radios may transmit back to a central node or server. In some embodiments, the capacity dictates the level of service that may be provided by user devices 90; the higher the capacity, the more user devices that may be implemented. The capacity may be determined using RF propagation model 60-3.

In some embodiments, deployment component 38 of system 10 may predict, via prediction database 60, optimal location(s) for deploying radio(s). In some embodiments, deployment component 38 is configured to guide a user or technician as to how to optimally deploy a set of radios to the optimal location(s). In some embodiments, no pre-engineering work is necessary for deploying the disclosed wireless network.

The guidance provided to a technician, e.g., via user interface device 18, may be as simple as GPS coordinates, if the modeling assumes a building top (i.e., assuming prior knowledge of a height of the building). Otherwise, the guidance may further include an antenna height. In these or other embodiments, deployment guide component may be able to use a user interface of user device 90. For example, when technicians use a handheld device or laptop, the technicians may establish connection (e.g., a secure one using a login and password, in some instances) using an application (app) running on that device. In this example, software may be running on radio 71, 72 and on user device 90, and the connection may be web-browser-based (e.g., using HTTP or HTTPS).

Some embodiments of deployment component 38 may facilitate iterative deployment. For example, a first radio may self-configure some operating parameters based on desired coverage, desired capacity, and measurements taken at the deployed location. Then, a technician may iteratively deploy each of the other radios, to a different location determined by a previously deployed and self-configured radio, until the desired coverage is satisfied by the deployed radios. In some embodiments, deployment component 38 may be implemented in a same radio that determined the location for deploying the first radio. And deployment component 38 may then determine, for one of the other radios, a new location using coverage information determined after the first radio is deployed. The one other radio may then be deployed, by the technician, to the determined, new location. In some embodiments, these locations are identified by 3D coordinates. At any time after an AP radio is deployed, the technician may use determinations of that radio (e.g., which may be based on user requirements and which may identify 3D locations) to deploy transceiver radios in a coverage area provided by this AP radio.

In some implementations, data is facilitated by transceivers 72 for video surveillance or for any another technological application. In these exemplary embodiments, the devices or systems comprising such video surveillance technology may be able to be placed temporarily in any location and for any application (e.g., military/defense, commercial, etc.). Some embodiments may facilitate rapid deployment of network 70. For example, a technician may initially provide information about desired coverage to a first of several radios, e.g., by loading initial data (e.g., a set of files). The first, initializing radio 71 may do propagation modelling to compute the ideal location for itself and communicate, e.g., via user interface device 18, to the technician that location for subsequent installation. The technician may deploy that radio, which may then run self-tests (e.g., including by using an RF propagation model) and may communicate the ideal location of the next (second) radio. The process may repeat itself (e.g., continually until deployment needs are met). For example, radios 71 may work together to re-compute the ideal location of the next radio, until all the radios needed to cover the required coverage area have been deployed. The radios may indefinitely configure themselves based upon continued re-examination of the RF propagation modeling and coverage modeling results.

Some embodiments of system 10 may satisfy one or more deployment criteria. For example, a potential user may demand a particular coverage area and/or particular locations for a set of radios. Deployment of network 70, though, may be predicated on provided locations of backhaul transport network connection points (e.g., for connecting network 70 to a fiber optic system). As such, some embodiments may prioritize radios that are near such backhaul network.

One or more of the components of processor 20 may be implemented in any computing device of any radio, node, or element of network 70. The disclosed approach is thus not limited to improving deployment of large radios on tall towers. Rather, the approach may be implemented in use cases requiring far more rapid deployment (e.g., a non-tower based system). For example, a governmental entity may desire to deploy a wireless, surveillance system for an impromptu or recently announced event. Such scenarios would not permit engineering development that would otherwise be performed pre-deployment. An exemplary need for rapid deployment is a security force (e.g., police) that wants to put up surveillance devices (e.g., cameras) around a region of a town or city to monitor a newly announced demonstration or protest. As such, some deployment criteria supportable by disclosed embodiments may be based on time, such as a maximum allotted time of 24 or 48 hours for deploying network 70 (during which there is not enough time to do pre-engineering development and modeling analyses). That is, a deployment of radios following the disclosed approach may be performed, in some instances, within a 24 or 48 hour period from when a new, network demand is made.

In some embodiments, an RF propagation model may be used after the at least one node connects to communications network 70. And this is so that, after this node determines a deployment location for another node, this location may be communicated to a deployment technician and/or to other radio(s) of the network. For example, a technician may install AP radio 71-1 on a building and then deploy two transceivers 72-1 and 72-2. In this example, both transceivers 72 should have coverage, but transceiver 72-2 may not have coverage yet. As such, transceiver 72-2 may not be able to communicate to the other radios to tell them how to configure themselves. It therefore does not provide any benefit, at this hypothetical time, for unconnected transceiver 72-2 to do any propagation modeling. Either or both of the other two radios 71-1 and 72-1, though, which are connected, may do the propagation modeling to make decisions for initial and/or subsequent configurations.

Figure 2:
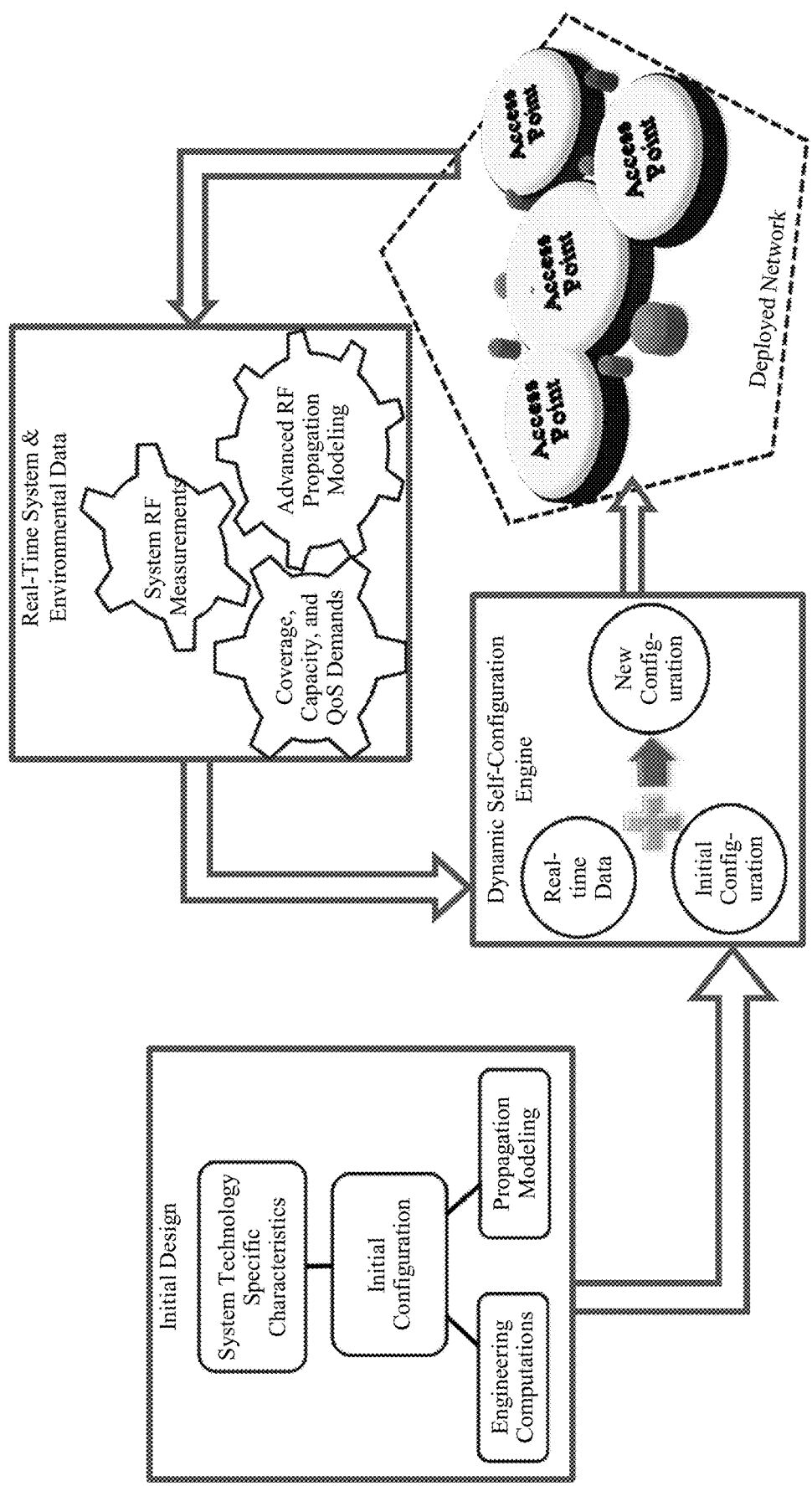
FIG. 2 depicts a process for dynamically self-configuring the network, in accordance with one or more embodiments.

FIG. 2 depicts a process for dynamically self-configuring a radio, which begins with an initial configuration and ends in continual configuration improvement based on real-time system and environmental data. For example, software operated by a technician may load an initial configuration into a first node by taking in technology-specific requirements to perform rudimentary computations (e.g., link budget, etc.) and rudimentary propagation modeling. In this or another example, the initial configuration may be improved upon by performing further propagation modeling based on performance demands (e.g., coverage, capacity, and quality) and live measurements of the radio's actual environment. With the new and improved configuration, the first radio may be deployed and used to help determine deployment locations of subsequent radios to-be-deployed in the network.

FIG. 3A depicts three different coverage areas (74-1, 74-2, and 74-3) provided by three different radios (71-1, 71-2, and 71-3). But this example is not intended to be limiting, as any number of coverage areas 74 for a deployed system may be provided by any number of radios 71 (and/or via radios 72).

FIG. 3B depicts nodes (e.g., AP radios 71) mounted on building tops, on a tower, or mounted on another structure that may provide coverage to other nodes (e.g., transceiver radios 72), each of which may be co-located with or directly connected to user device 90 (not shown). Some implementations may have a combination of radios on towers or buildings, and other radios may be, e.g., down at a ground or street level.

In some embodiments, processors 20 is communicatively coupled to a transceiver (e.g., 72-1), which may be in turn communicatively coupled to sensor 90-$n$, e.g., for taking one or more images; these images may then be communicated, via network 70, to another device. This co-location may be characterized by a wired connection between the two devices of about a few feet or less and/or by being within an enclosure or box (e.g., which is mounted on a poll or another structure), whereas the direct connection may be wired (e.g., via a 100-300 foot cable) or wireless (e.g., via a separate mesh network or Bluetooth link). Network 70 may comprise dozens of transceivers 72 for dozens of cameras 90.

Figure 3C:
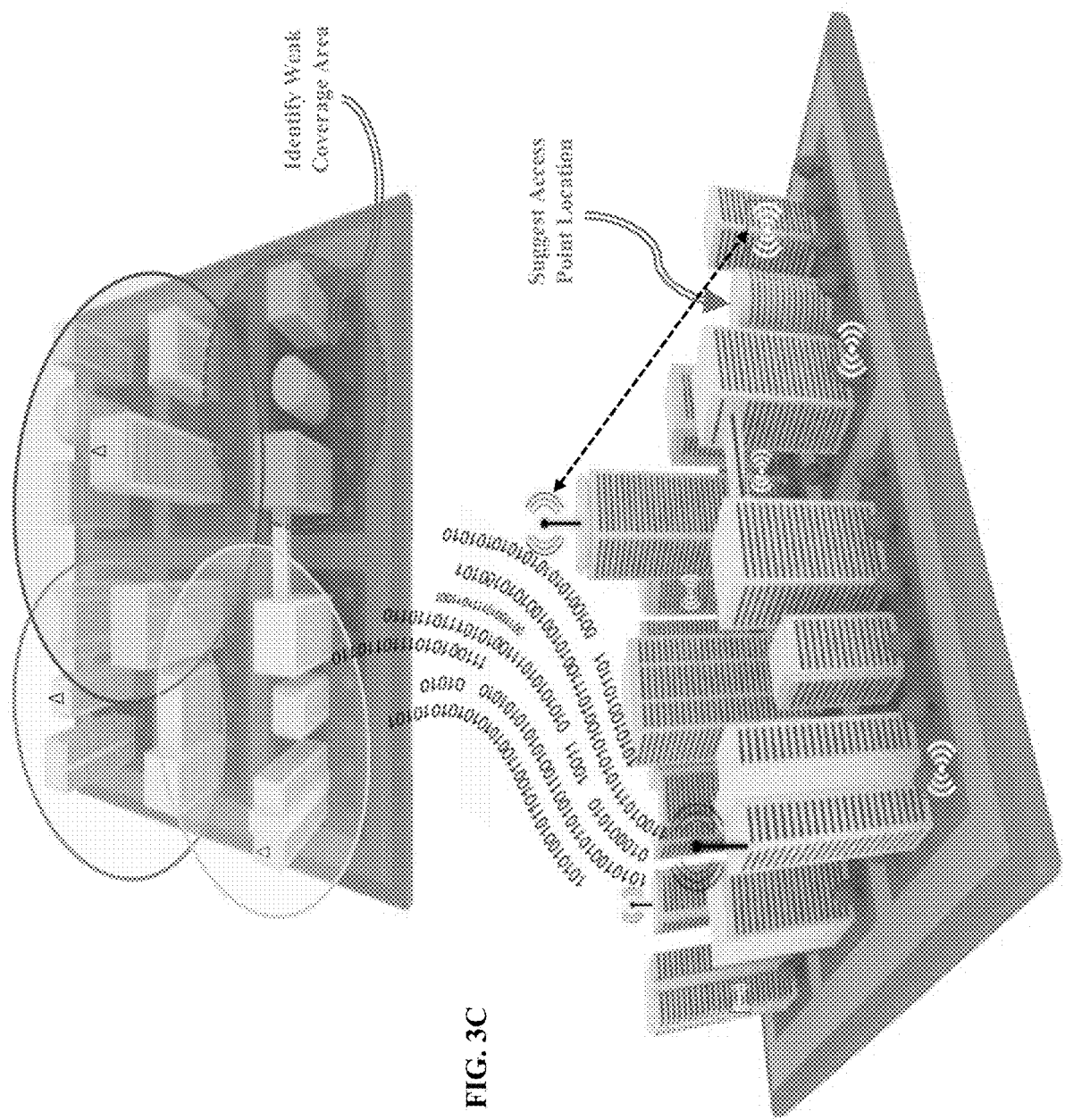
FIG. 3C depicts, from two different perspectives, deployment at the exemplary site of the self-configuring, dynamic network, the upper portion showing data being communicated between the radios to identify an area desired to be covered (but not currently being covered), and the lower portion showing determination of an optimal location at which a new radio may be deployed for providing new coverage to another transceiver, in accordance with one or more embodiments.

FIG. 3C shows that any one deployed radio or a plurality of deployed radios of network 70 working together may determine that the performance (e.g., throughput) of a transceiver is low based on a poor coverage area such that a new radios is determined to be deployed to provide better coverage to that transceiver.

Figure 3D:
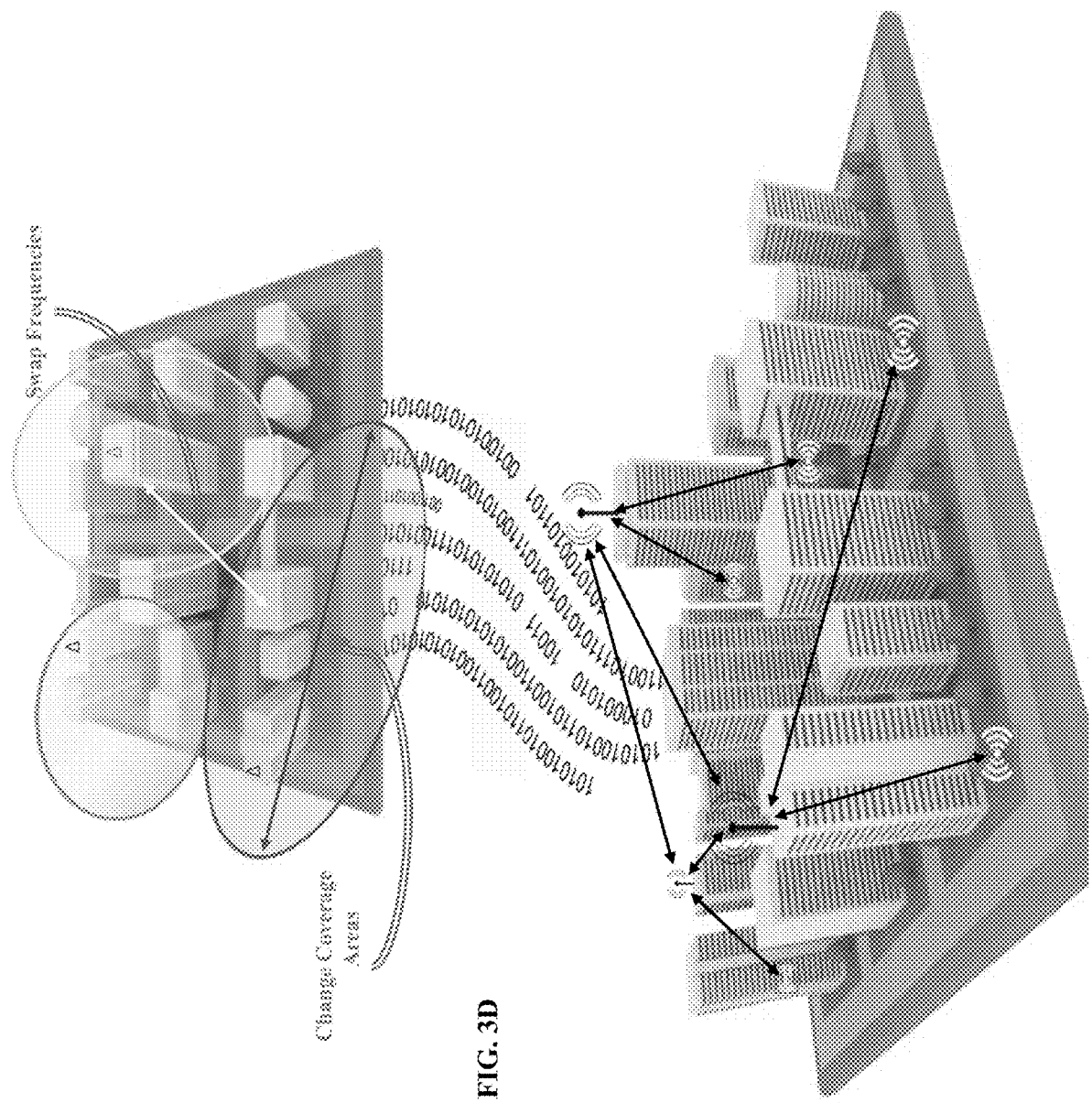
FIG. 3D depicts, from two different perspectives, deployment at an exemplary site of a self-configuring, dynamic network, the upper portion showing adjustment of a coverage area and adjustment of operating frequencies for wireless devices of the network, and the lower portion showing communications links between nodes and transceivers, in accordance with one or more embodiments.
Figure 3E:
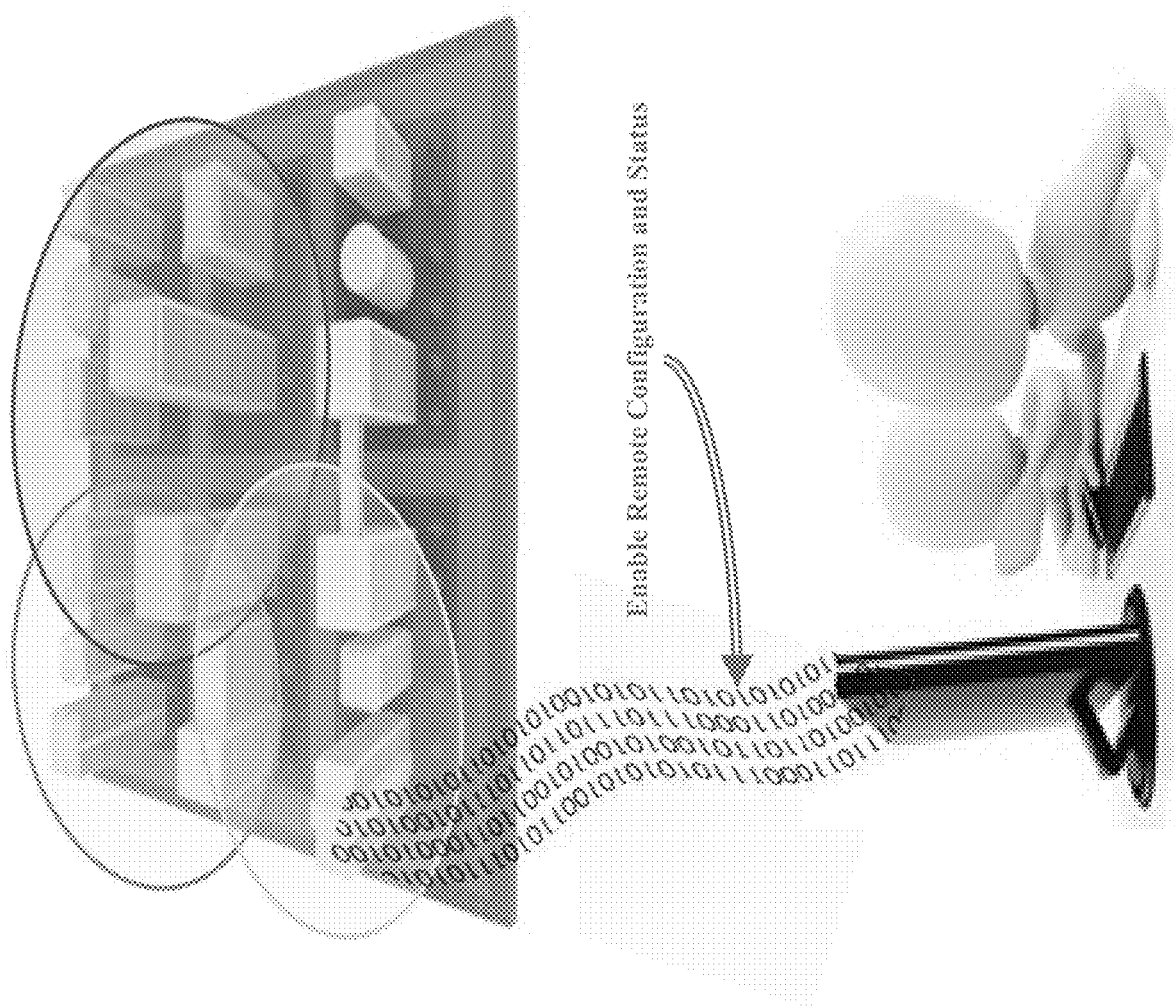
FIG. 3E depicts deployment at the exemplary site of the self-configuring and dynamic network for continued operation and alternative adaptation based on remote or local user-configuration, in accordance with one or more embodiments.

FIG. 3D depicts an example scenario where two or more coordinating nodes determine that performance would be improved if the two nodes swap operating frequencies. In some embodiments, each radio of network 70 may know which RF parameters are being used in each other radio of the network. In some embodiments, the communication links depicted in FIG. 3D may facilitate network traffic, such as command data, status data, and application/service data. The communications links may be analog or digital. In these examples, this data may travel between each of radios 71. In other examples, such data may travel between radios 71 and transceivers 72, between transceivers 72 themselves, or between radios 71, 72 and devices outside of network 70. Data communications may occur, when transceiver radios 72 are in the coverage provided by the respective radio 71.

As depicted in FIG. 4A, some changes in system 10 may require a drastic, new configuration, e.g., that includes deployment of another AP radio. That is, in FIG. 4A, the towers may represent AP radios 71, and the smaller circles may represent wireless transceivers 72. The example of FIG. 4A thus shows that a current demand requires a fourth AP radio 71 to be deployed to support communication for the six transceivers 72. When more transceiver radios 72 are deployed, as shown in FIG. 4B, higher service load demands may be imparted upon the system. In this example of FIG. 41B, the number of transceivers 72 increases from six to fourteen. The additional capacity required may require either additional AP radios, additional spectrum usage, a new frequency plan, or a combination of these changes. Disclosed systems, by nature of some embodiments being tactical or due to demands of electromagnetic spectrum, may be able to handle and adapt to changes in external RF interference sources. For example, FIG. 4C shows an example where one source of interference (the darker circle) becomes three interference sources at a location closest to the newly deployed node (i.e., of FIG. 4A). This handling and adaptation is not explicitly shown in the example of FIG. 4C, due to the handling and adaptation being primarily made by adjusting the operating parameters of at least some of the nodes, for the changing characteristics and geographic locations over time.

In some embodiments, system 10 may facilitate reconfiguration of an existing network. For example, an approach may not be to use the iterative configuration scenario. That is, a network of system 10 may be pre-engineered, and then that exact configuration of cells, APs, and transceivers may be deployed. Afterwards, system 10 may only make use of the automated period reconfiguration.

Figure 5:
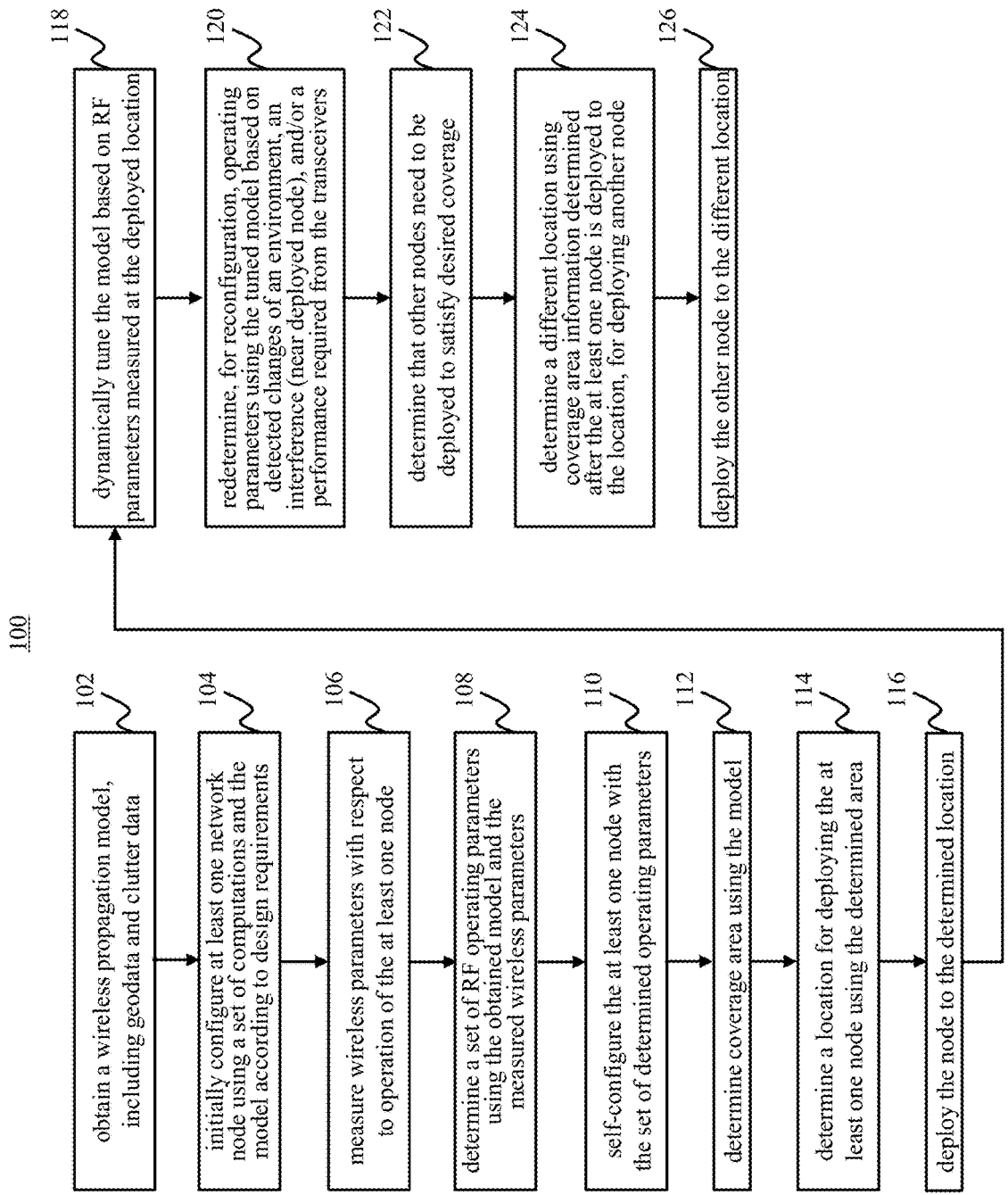
FIG. 5 illustrates a process for optimally deploying and dynamically self-configuring wireless nodes, in accordance with one or more embodiments.

FIG. 5 illustrates method 100 for dynamically configuring radios of a network, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 5 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, a wireless propagation model, including geodata, may be obtained. As an example, the propagation model is an RF propagation model, and the geodata may comprise terrain data 60-1 and clutter data 60-2. In some embodiments, operation 102 is performed by a processor component the same as or similar to modeling component 32 (shown in FIG. 1 and described herein).

At operation 104 of method 100, at least one network node may be initially configured using a set of computations and the obtained model (according to design requirements). As an example, the initial configuration may be minimal (e.g., to be able to initially run the obtained model) and performed at a pre-deployment location. In this or another example, the initial configuration is performed using a different (e.g., statistically generated) model. In some embodiments, operation 104 is performed by a processor component the same as or similar to configuration component 34 (shown in FIG. 1 and described herein).

At operation 106 of method 100, wireless parameters with respect to operation of the at least one node may be measured. As an example, these measurements may be performed at a location at which the at least one node is initially configured. In some embodiments, operation 106 is performed by a processor component the same as or similar to measurement component 30 (shown in FIG. 1 and described herein).

At operation 108 of method 100, a set of wireless operating parameters may be determined using the obtained model and the measured wireless parameters. In some embodiments, operation 108 is performed by a processor component the same as or similar to modeling component 32 (shown in FIG. 1 and described herein).

At operation 110 of method 100, the at least one node with the set of determined operating parameters may be self-configured. Upon configuring a node with the determined parameters, the node may perform better. In some embodiments, operation 110 is performed by a processor component the same as or similar to configuration component 34 (shown in FIG. 1 and described herein).

At operation 112 of method 100, coverage area may be determined using the model. As an example, the determined coverage area may be deterministically determined. In some embodiments, operation 112 is performed by a processor component the same as or similar to modeling component 32 (shown in FIG. 1 and described herein).

At operation 114 of method 100, a location for deploying the at least one node using the determined coverage area may be determined. As an example, this location may be different from the location at which the at least one node is initially configured. And this determination may be performed by the computing device of the at least one node. In some embodiments, operation 114 is performed by a processor component the same as or similar to modeling component 32 (shown in FIG. 1 and described herein).

At operation 116 of method 100, the node may be deployed to the determined location by a technician following locally generated guidance. As an example, the guidance may be provided to the technician via a user interface of the to-be-deployed node itself or via a device operated by the technician that communicates with the to-be-deployed node. In some embodiments, operation 116 is performed by a processor component the same as or similar to deployment component 38 (shown in FIG. 1 and described herein).

At operation 118 of method 100, the model may be dynamically tuned based on RF parameters measured by the deployed node at the deployed location. In some embodiments, operation 118 is performed by a processor component the same as or similar to model tuning component 36 (shown in FIG. 1 and described herein).

At operation 120 of method 100, operating parameters may be redetermined using the tuned model based on a detected change in (i) an environment of the node, (ii) an interference (e.g., near the deployed node), and/or (iii) a performance required from transceivers. As an example, the terrain may change (e.g., due to a construction or landscaping project), the clutter may change, interfering radios may be introduced in or near network 70, or users of network 70 may demand a higher level of service. As a result, the computing device(s) implementing one or more aspects of method 100 may be triggered to redetermine operating parameters. The at least one node may then be self-reconfigured with the redetermined parameters such that a coverage area and/or capacity for the one or more transceivers in said area improves. In some embodiments, operation 120 is performed by a processor component the same as or similar to modeling component 32 and/or configuration component 34 (shown in FIG. 1 and described herein).

At operation 122 of method 100, whether other nodes need to be deployed may be determined, to satisfy desired coverage. In some embodiments, operation 122 is performed by a processor component the same as or similar to modeling component 32 (shown in FIG. 1 and described herein).

At operation 124 of method 100, a different location may be determined using coverage area information determined after the at least one node is deployed to the location, for deploying another node. In some embodiments, operation 124 is performed by a processor component the same as or similar to modeling component 32 (shown in FIG. 1 and described herein).

At operation 126 of method 100, the other node may be deployed to the different location. In some embodiments, operation 126 is performed by a processor component the same as or similar to deployment component 38 (shown in FIG. 1 and described herein).

Techniques described herein can be implemented in digital electronic circuitry, or in computer hardware, firmware, software, or in combinations of them. The techniques can be implemented as a computer program product, i.e., a computer program tangibly embodied in an information carder, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. An iterative method for configuring a network, the network comprising one or more nodes each configured to provide wireless coverage to one or more transceivers, the iterative method comprising:
    deploying, to a location, at least one of the one or more nodes with an initial configuration;
    obtaining a wireless propagation model and at least one of a target coverage and a target capacity;
    iteratively measuring, in real-time at the location, a set of wireless parameters with respect to operation of at least one of the one or more transceivers and the at least one node;
    dynamically adjusting the propagation model using the most recent set of measured parameters;
    determining a set of operating parameters using the dynamically adjusted model; and
    self-configuring, via a computing device of at least one of the one or more transceivers and the at least one node, with the set of operating parameters until at least one of the target coverage and the target capacity is satisfied.

2. The method of claim 1,
    wherein each of the one or more transceivers is communicatively coupled to a sensor.

3. The method of claim 1, wherein the computing device is embedded in at least one of the one or more transceivers and the at least one node.

4. The method of claim 1, wherein the computing device is part of a node that is different from the one or more transceivers and the at least one node.

5. The method of claim 1, wherein the computing device is integrated with a transceiver otherwise used to facilitate communication to and/or from the at least one node that provides the transceiver coverage.

6. The method of claim 1, further comprising:
determining, via the computing device, an area of the wireless coverage using the propagation model or the dynamically adjusted model;
determining, via the computing device for the at least one node, a different location using the determined coverage area; and
deploying the at least one node to the different location,
wherein the operation of the at least one node is performed at the location, and
wherein, as a result of the deployment to the different location, the at least one node performs better.

7. The method of claim 6, further comprising:
wherein the propagation model is a radio frequency (RF) propagation model,
wherein the set of measured parameters comprises one or more RF parameters, and
wherein the dynamically adjusted model is deterministic,
wherein the better performance, as a result of the deployment of the at least one node to the different location, is based on speed, RF spectrum usage, or a combination of the speed and RF spectrum usage, and
wherein, as a result of the dynamic adjustment(s), the at least one node performs with better accuracy.

8. The method of claim 1, wherein the set of operating parameters comprises information about two or more of an output power, a frequency, a bandwidth, a type of channel coding, an amount of forward error correction, and a modulation.

9. The method of claim 1, wherein the use of the dynamically adjusted model involves environmental terrain data and clutter data.

10. The method of claim 9, wherein the clutter data identifies a three-dimensional (3D) location of each of a plurality of objects, the 3D location comprising a height of the each object.

11. The method of claim 1, further comprising:
determining, via the propagation model or the dynamically adjusted model, a capacity per unit area based on an aggregate throughput supported by the one or more transceivers operating in the unit area.

12. The method of claim 7, further comprising:
triggering a redetermination, via the computing device, of at least one of the set of operating parameters using the dynamically adjusted model based on a detected change in at least one of (i) an environment of the at least one node, (ii) an interference with respect to wireless operation of the at least one deployed node, and (iii) a performance required from the one or more respective transceivers; and
reconfiguring, via the computing device, the at least one node with the at least one redetermined operating parameter such that an area of the coverage for the one or more transceivers changes,
wherein, as a result of the reconfiguration, the at least one node performs with better accuracy.

13. The method of claim 6, further comprising:
determining that one or more other nodes need to be deployed to satisfy desired coverage;
determining, via the computing device for one of the other nodes, another location different from the location and the different location using coverage information determined after the at least one node is deployed to the different location; and
deploying the one other node to the determined other location,
wherein the locations are 3D locations, and
wherein the better performance, as a result of the deployment of the at least one node to the different location, is based on accuracy.

14. The method of claim 13, further comprising:
determining a number of the one or more transceivers needed to satisfy desired capacity; and
determining a 3D location for installing each of the one or more transceivers.

15. The method of claim 1, wherein each of the one or more nodes is an access point radio.

16. The method of claim 13, wherein the determination of the other location comprises determining a dead zone and using one or more RF parameters measured by the at least one node at the first different location.

17. The method of claim 12, further comprising:
machine-learning behavior of the network such that the change is detected as regularly occurring at a certain location and time, wherein the machine-learning comprises a prediction of the behavior by a trained model,
wherein the better performance, as a result of the reconfiguration, is based on speed, RF spectrum usage, or a combination of the speed and RF spectrum usage.

18. The method of claim 6,
wherein parameters of the initial configuration are determined based on a link budget analysis and on a different propagation model, and
wherein the different propagation model is statistical.

19. An apparatus, comprising:
one or more sensors;
a non-transitory memory including instructions stored thereon for configuring a network, the network comprising one or more nodes each configured to provide wireless coverage to one or more transceivers; and
one or more processors operably coupled to the non-transitory memory, the one or more processors being configured to execute the instructions, causing:
initially configuring at least one of the one or more nodes;
obtaining a target coverage and a target capacity;
iteratively obtaining, via the one or more sensors over time, a set of wireless parameters in relation to at least one of the one or more transceivers and the at least one node;
dynamically determining a set of operating parameters using (i) an RF propagation model and (ii) the set of most recently obtained parameters; and
reconfiguring the at least one node with the dynamically determined set of operating parameters until the target coverage and the target capacity are satisfied.

20. An iterative method for configuring a network, the network comprising a plurality of radios each configured to provide wireless coverage to a plurality of transceivers, and the method comprising:
deploying one of the plurality of radios to a location using a wireless propagation model;
self-configuring, via the one node, a plurality of operating parameters based on desired coverage, desired capacity, and measurements taken at the deployed location; and iteratively deploying each of the other radios, to a different location determined by a previously deployed radio, until the desired coverage and/or capacity is satisfied by the deployed nodes,
wherein each of the radios is self-configured before determining a location of a next-deployed radio.

* * * * *